UNITED STATES PATENT OFFICE.

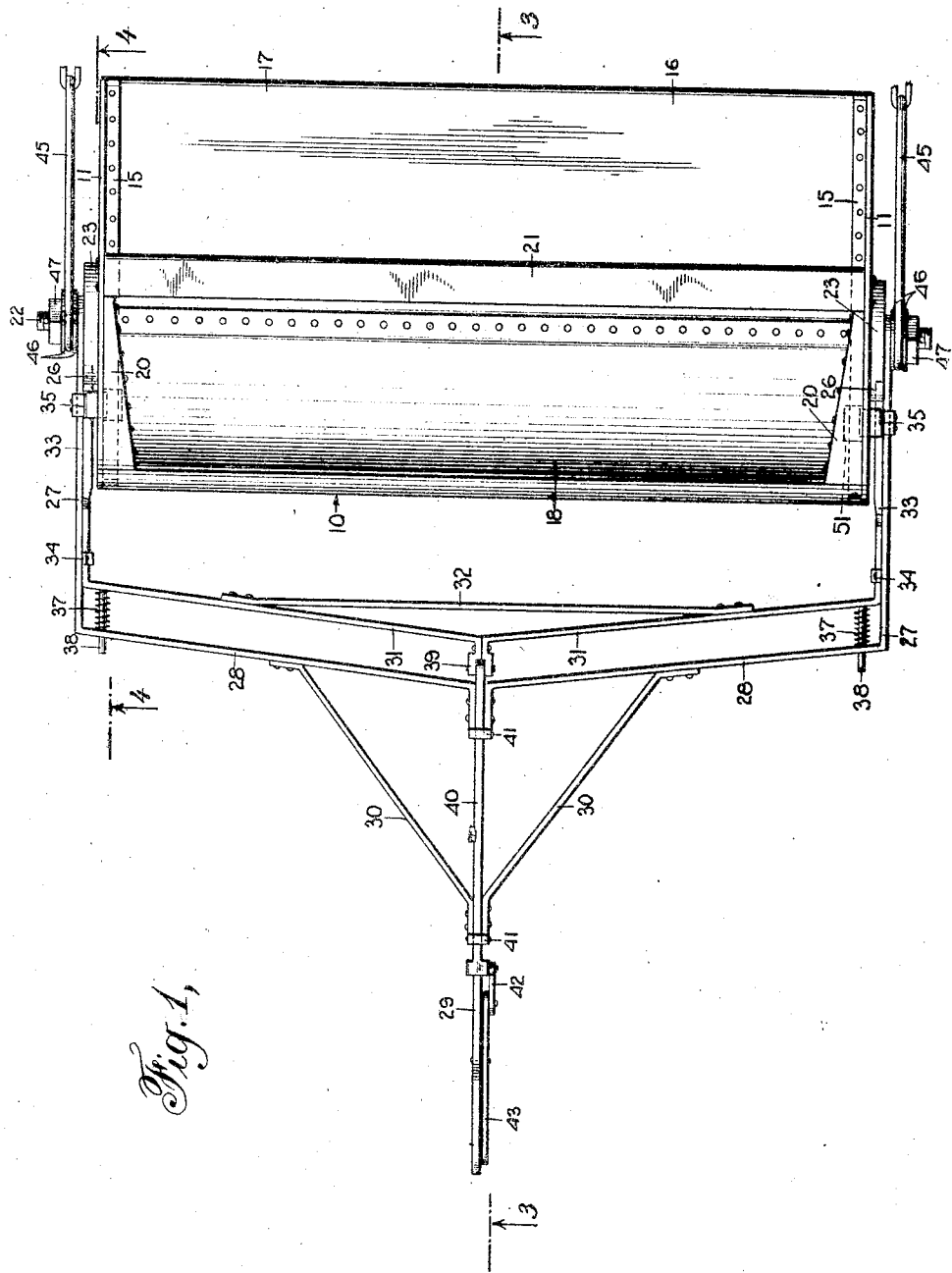

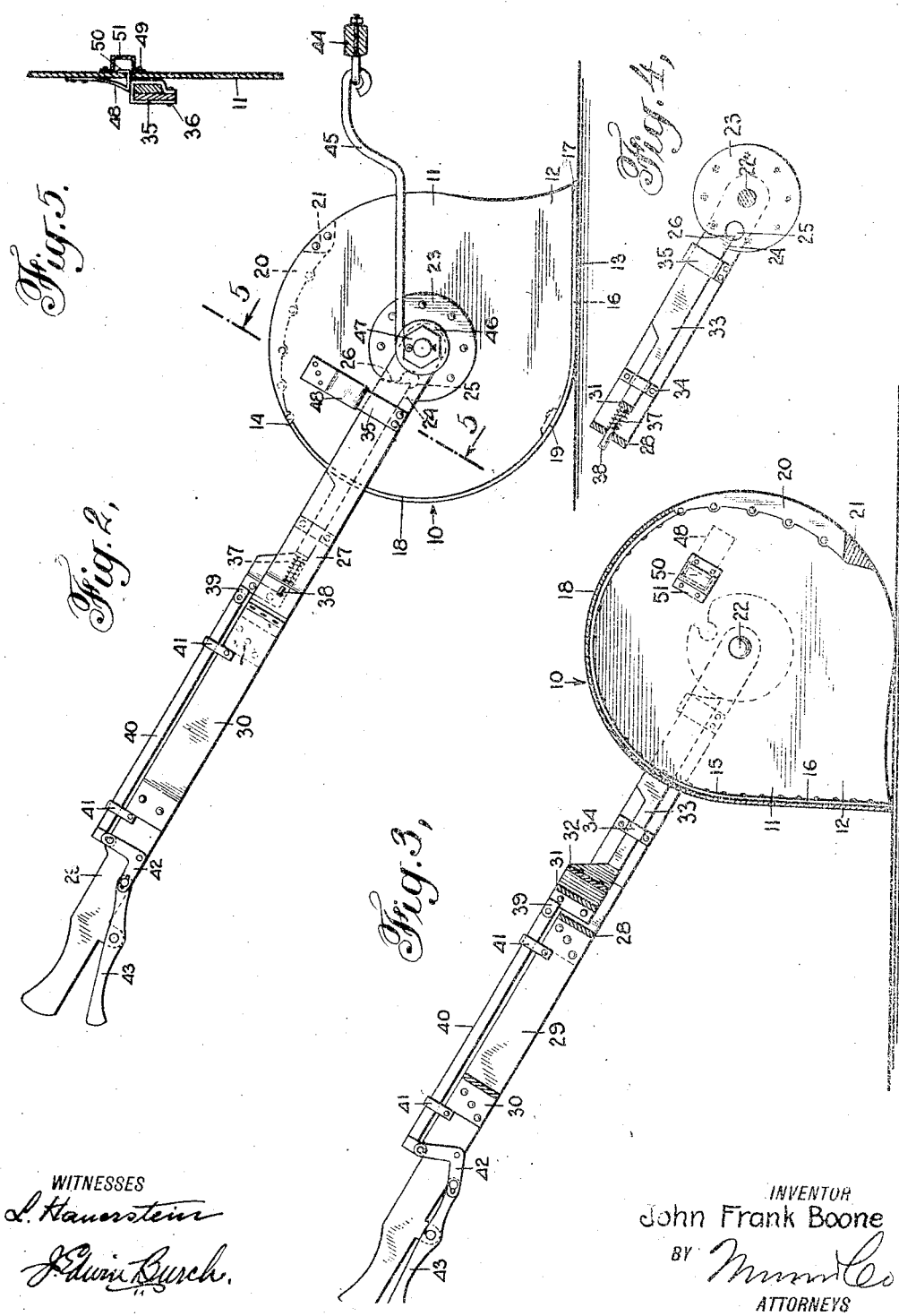

JOHN FRANK BOONE, OF NEW YORK, N. Y.

SELF-DUMPING FRESNO SCRAPER.

1,164,459.  Specification of Letters Patent.  Patented Dec. 14, 1915.

Application filed February 6, 1915. Serial No. 6,539.

*To all whom it may concern:*

Be it known that I, JOHN FRANK BOONE, a citizen of the United States, and a resident of the city of New York, borough of Brooklyn, in the county of Kings and State of New York, have invented a new and Improved Self-Dumping Fresno Scraper, of which the following is a full, clear, and exact description.

This invention relates to improvements in dirt scrapers and more particularly to Fresno scrapers or scrapers for handling loose dirt, such as in leveling ground previously plowed when the land is about to be irrigated, as distinguished from slip scrapers, such as used on reclamation projects to cut into the solid earth and carry it off.

Among the objects of the invention are to provide a scraper of the type specified in which the container or scraper body is rotatably fixed to an operating handle forming a part of a frame in such a manner that when the scraper is advanced along the ground it will be under absolute control of the driver or attendant in collecting and dumping a load, the scraper being so constructed that the container will be normally held from rotation but may be released and caused to revolve independent of the handle bar without capsizing the entire machine, handle bar and all, as is necessary with the usual Fresno scrapers. In the present device the container is so constructed as to take the load under the control of the driver, to be projected into the earth to cause the dumping thereof at any desired point and to return to an operative position during the continued advancement thereof by rolling of the container, while novel means are provided for holding the container against rotation or revolving movement in either direction unless released, such means being capable of operation by one hand so that the other hand will be free for the sole use of handling the team.

With the above and other objects in view, the invention resides in the peculiar combination and arrangement of parts to be hereinafter more fully described, illustrated and claimed, it being also an object to provide a machine which is simple in construction, durable and efficient in operation and not likely to get out of working order.

Reference is to be had to the accompanying drawings forming a part of this specification, in which similar characters of reference indicate corresponding parts in all the views and in which—

Figure 1 is a plan view of the improved scraper taken at right angles to the frame and handle bar as shown in Fig. 2; Fig. 2 is a side elevation of the device as shown in Fig. 1; Fig. 3 is a longitudinal sectional view taken on the line 3—3 of Fig. 1 and showing the container in a dumping position; Fig. 4 is a similar view taken on the line 4—4 of Fig. 1; and Fig. 5 is a detail sectional view taken on the line 5—5 of Fig. 2.

As illustrated in the drawings, the improved scraper comprises a container or scraper body 10 which is made somewhat scoop-shape and substantially cylindrical or circular in cross section for a greater portion of its circumference. This body is made up of end sections 11 preferably of sheet metal and tapered toward the bottom and cutting edge as shown at 12, and the bottom edges of the end sections adjacent thereto are made straight, as shown at 13. From the point 14, slightly in rear of the maximum point of height or top of the container or body, that is, with respect to the end sections 11, the latter are provided with inwardly extending flanges 15 to which a cutting blade 16 is secured, preferably by bolting. The cutting blade 16 is secured to the bottom faces of the flanges and is provided with a sharpened cutting edge 17 at the extreme ends of the tapered portions 12 so as to positively engage the earth for scraping the same. This blade is preferably of steel while a malleable metal back portion 18 is also secured to the flanges 15 of the end sections between the rear edge 19 of the blade 16 and the point 14, above and forwardly of which, at the top edges of the end sections, the container or body is counterbalanced by weights 20 which are riveted or otherwise secured to the end sections. The counterbalancing weights and reinforcing portions 20 may be casted and connected by a longitudinal brace 21 also producing a counterweight, but the essential feature of the brace is that it serves as a counterweight to assist in revolving or rotating the container after having dumped its load, as will be hereinafter explained, and to strengthen the container or scraper body by resisting outward or inward pressure against the end sections.

Mounted axially through the end sections 11 are trunnions 22 which project outwardly, and secured as by riveting to said end sections at their outer faces are cams 23, the same having notches producing shoulders 24 having openings 25 communicating with the inner ends of the notches between the shoulders and the camming surfaces 26 above the latter, the openings permitting the notches to be relieved of the collection of dirt and foreign matter. Pivoted to the trunnions 22 outwardly of the cams 23 are parallel side portions 27 of a frame 28 comprising oppositely extending and forwardly diverging sections bent to form the side portions 27 so that the container or scraper body may have rotation relative thereto. A handle bar 29 is fixed to the portions 28 and is further strengthened by diagonal braces 30 extending between the handle and the parts 28.

Carried by the frame and the handle bar and coöperating with the cams are means to lock and hold the container or scraper body against revolving movement or to permit the same to turn as desired, and for this purpose an auxiliary frame including a cross piece 31 with oppositely diverging portions parallel to the portions 28 is provided, and said portions are made rigid by a transverse brace 32, while the ends of the portions 31 are bent forwardly in parallel relation to provide latch bolts 33 which are enlarged at their forward ends. The portions 33 have sliding movement through guides or strap irons 34 adjacent to the portions 31 and fixed to the side portions 27, while their enlarged portions operate through guide loops 35 also carried by the portions 27, each loop consisting of a single section of metal or casting disposed against the outer face of a side portion 27 and spaced from the inner side thereof, the loops being passed over the side portions and riveted or otherwise connected thereto at their lower ends, as shown at 36.

Normally the tapered forward engaging ends of the latch bolts 33 are held into engagement with the notches of the cams 23, this being accomplished through the medium of expansible springs 37 mounted on stems 38 between the parallel portions 28 and 31 at each side of the frame, the stems being fixed to the portions 31 and passing through apertures in the portions 28 so that the springs will be compressed against the latter when the bolts are withdrawn from the notches, free of the peripheral edges of the cams to permit the container or scraper body to turn. For this purpose the cross piece of the auxiliary frame is provided with a centrally disposed and upwardly offset coupling member 39 in the form of spaced ears between which the forward end of a latch rod 40 is pivoted. This latch rod operates through guide loops 41 fixed to the handle bar at the upper edge of the latter, and the rear end of the rod 40 is bifurcated to straddle the handle bar adjacent to the handle portion thereof. Pivoted to said handle bar is a bell crank lever 42 having slotted ends in pivotal engagement with the rear end of the rod 40 and the forward end of a latch handle 43 in turn pivoted intermediate of its ends to a depending projection from the handle bar.

Normally the latch handle is spaced from the handle portion of the handle bar and the springs 37 hold the latch bolts in engagement with the notches of the cams so as to prevent the container from turning with respect to the frame. In this position the scraper may be advanced by suitable draft means, as by a team connected to a draft bar or evener 44 connected by means of links 45 to the trunnions 22 outwardly of the cams, in order to gather up loose dirt until the same has filled the container. The dirt can never get higher than the back portion 18 and if it reaches this height further loading will result in the discharge of the dirt rearwardly over the top edge of said back portion. The links 45 are preferably connected between spaced washers 46 with suitable lock nuts 47 or other retaining means mounted on the trunnions outwardly thereof in order to hold the links, as well as the frame, from displacement with respect to the trunnions.

Secured to the end sections 11 of the container at right angles to the side portions of the frame are spring lugs 48 consisting of flat strips of spring metal riveted or otherwise secured to the outer faces of said sections and having their free ends bent inwardly through slots 49 in the sections 11, the inner ends of said rebent portions being directed at right angles as shown at 50 and constituting means to limit the outward displacement of the lugs but to permit their free inward movement protected by inclosures or caps 51 secured to the inner faces of the sections so that collection of dirt in the slots to interfere with the movements of the lugs will be obviated. These lugs normally project outwardly and together with the shoulders of the cams prevent turning of the container in either direction, but when the container has been filled it may be emptied of its contents or dumped by directing the edge 17 of the blade 16 into the ground and by releasing the latch bolts from the shoulders of the cams by operation of the latch handle. Prior to releasing the latch bolts the handle bar is slightly elevated so as to take the strain from the shoulders or teeth of the cams, which thus being relieved of pressure will permit free movement of the latch handle and bolts to draw the latter free of the cams and permit the container to turn for emptying its contents, as shown in Fig. 3, upon the continued advancement of the scraper. In thus operating the device only one hand of the driver will be used to grasp the handle bar, while the other hand will be entirely free for driving the team.

In explaining the method of causing the edge 17 to project into the earth it is to be understood that the side portions of the frames and particularly the loops 35 will engage the spring lugs 48 after the bolts are raised from the shoulders of the cams, thus imparting a tipping movement to the container which, by reason of the counterbalanced portions and the fact that it is circular for a greater portion of its circumference, will cause it to continue to roll or turn during the advancement of the scraper until the spring lugs snap by the sides of the frame and the latch bolts snap over the shoulders 24 and thus again hold the container against turning and ready for the next load.

Having thus described my invention, what I claim as new and desire to secure by Letters Patent is:—

1. A scraper of the class described, comprising end sections of sheet metal, said end sections being circular in contour for greater portions of their circumferences and having tapered portions with straight bottom edges and with inwardly extending flanges along said straight edges and upwardly in rear of the same, a blade attached to said flanges at said straight edges, a back portion attached to said flanges in rear of and continuously with the blade, counterbalancing weights at the top portions of the sections and including a brace extending between the same, trunnions carried by said end portions, draft means attached to said trunnions, a frame pivoted to the trunnions and having a handle bar for manipulating the same and coöperative means carried by the end sections and frame to hold the container against turning or to permit the same to revolve as desired.

2. In a dumping scraper, the combination with a scraper body of substantially cylindrical form with a scraping edge and trunnions projecting outwardly from the ends thereof in axial alinement; of cams fixed to the ends of the body and having shoulder portions, a frame straddling the body and pivoted to the trunnions, said frame having a handle bar projecting rearwardly from its central portion, latch bolts slidably mounted on the frame to coöperate with said shoulders to normally prevent turning of the body with respect to the frame, means carried by the handle bar for operating said latch bolts to release the same from the shoulders, said cams having openings adjacent to said shouldered portions to prevent the collection of dirt and foreign matter therein and means at the ends of the body and coöperating with the frame, whereby elevation of the latter through the medium of the handle bar to free the bolts from the shoulders whereby the bolts may be drawn, will result in the tipping of the body to engage the earth for causing turning of the body to empty its contents.

3. In a dumping scraper, the combination with a scraper body of substantially cylindrical form with a scraping edge and trunnions projecting outwardly from the ends thereof in axial alinement; of cams fixed to the ends of the body and having shoulder portions, a frame straddling the body and pivoted to the trunnions, said frame having a handle bar projecting rearwardly from its central portion, draft means connected to the trunnions, spring lugs fixed to the ends of the body and projecting outwardly therefrom but adapted to spring inwardly, an auxiliary frame including latch bolts slidably mounted on the first named frame to coöperate with the shouldered portions of the cams, guide loops for said latch bolts, spring means between the frames to cause engagement of the latch bolts with the cams, said handle bar being braced to the first mentioned frame, and a latch handle pivoted to the handle bar and connected to the auxiliary frame for shifting the latter against the action of the springs to disengage the bolts from the cams, whereby the body may turn for dumping its contents, said lugs serving as means for engagement by the side portions of the first named frame, and loops for initially projecting the scraping edge of the body into the earth to cause the turning of the body and adapted to snap by said portions and loops by rolling of the body during the advancement of the scraper.

In testimony whereof I have signed my name to this specification in the presence of two subscribing witnesses.

JOHN FRANK BOONE.

Witnesses:
  JOHN E. BURCH,
  PHILIP D. ROLLHAUS.